US006459371B1

(12) United States Patent
Pike

(10) Patent No.: US 6,459,371 B1
(45) Date of Patent: Oct. 1, 2002

(54) LOCATING DEVICE

(76) Inventor: Steven Derek Pike, Unit 16, Ribocon Way, Progress Business Park, Luton Beds LU4 9UR (GB)

(*) Notice: Subject to any disclaimer, the term of this patent is extended or adjusted under 35 U.S.C. 154(b) by 0 days.

(21) Appl. No.: 09/529,467

(22) PCT Filed: Sep. 17, 1998

(86) PCT No.: PCT/GB98/02830

§ 371 (c)(1), (2), (4) Date: Apr. 13, 2000

§ 102(e) Date: Apr. 13, 2000

(87) PCT Pub. No.: WO99/21149

PCT Pub. Date: Apr. 29, 1999

(30) Foreign Application Priority Data

Oct. 20, 1997 (GB) ............................................. 9722086

(51) Int. Cl.[7] ............................. H04Q 7/00; H04R 3/00

(52) U.S. Cl. ............. 340/539; 340/825.36; 340/825.49; 455/74; 455/569; 455/575; 381/122

(58) Field of Search ............................ 340/539, 825.39, 340/825.49; 455/74, 569, 575; 381/12; 701/213; 342/357.07, 357.06

(56) References Cited

U.S. PATENT DOCUMENTS

| | | | | |
|---|---|---|---|---|
| 4,665,385 A | | 5/1987 | Henderson | 340/539 |
| 5,193,215 A | | 3/1993 | Olmer | 455/66 |
| 5,196,825 A | | 3/1993 | Young | 340/539 |
| 5,223,844 A | | 6/1993 | Mansell et al. | 342/357 |
| 5,400,011 A | | 3/1995 | Sutton | 340/566 |
| 5,410,739 A | * | 4/1995 | Hart | 455/66 |
| 5,422,816 A | * | 6/1995 | Sprague et al. | 455/89 |
| 5,555,286 A | | 9/1996 | Tendler | 379/59 |
| 5,884,199 A | * | 3/1999 | Maki | 455/575 |
| 6,028,514 A | * | 2/2000 | Lemelson et al. | 340/539 |
| 6,044,257 A | * | 3/2000 | Boling et al. | 455/404 |

FOREIGN PATENT DOCUMENTS

| | | |
|---|---|---|
| DE | 9 411 778 U | 11/1994 |
| EP | 0 789 498 A2 | 8/1997 |
| EP | 0 809 117 A2 | 11/1997 |
| FR | 2 731 289 A | 9/1996 |
| GB | 2 051 444 B | 1/1981 |
| GB | 2 223 380 A | 4/1990 |
| GB | 2 223 869 B | 4/1990 |
| GB | 2 247 761 A | 3/1992 |
| WO | WO 80/00630 A | 4/1980 |
| WO | WO 96/19891 A | 6/1996 |

OTHER PUBLICATIONS

Allison, C.R. "Personal Location/Alarm Systems," *Motorola Inc. Technical Developments*, vol. 13, Jul. 1991, pp. 74–76.

International Search Report, prepared European Patent Office, dated Jan. 4, 1999.

* cited by examiner

*Primary Examiner*—Donnie L. Crosland
(74) *Attorney, Agent, or Firm*—Merchant & Gould P.C.

(57) ABSTRACT

A locating device for use with a portable two-way radio transceiver, for enabling the radio transceiver to transmit a locating signal containing position locating information. The locating device comprises a sensor (510) for sensing a signal containing position locating information, a memory (504) for storing position locating information obtained from the signal, a communications device (507) for communicating with the radio transceiver, a control device (504) for controlling the radio transceiver via the communications device (507) and an activating device (517) for activating the locating device. When the locating device is activated, the control device (504) causes the radio transceiver to transmit a locating signal containing the position locating information stored in the memory (504).

20 Claims, 4 Drawing Sheets

LOCATING DEVICE

The present invention relates to a microphone unit for use with a portable two-way radio transceiver, for enabling oral communication via the radio transceiver, said microphone unit including a locating device for enabling said radio transceiver to transmit a signal containing position locating information.

In particular, but not exclusively, the invention relates to an alarm device which, when utilised in conjunction with a separate radio transceiver, provides that transceiver with features which did not previously exist. These additional features enable the location of the user of that transceiver to be determined automatically or manually, independently of or as a result of the activation of an alarm, either directly or indirectly. This location information may be reported to the user of the hand held radio, other system users or a central controller. The added device will therefore provide the transceiver with a number of very useful features which may not have been originally incorporated within the original product at a very economic cost.

Prior art devices which exist are described by patent No. GB 2 051 444B (Ericsson), patent No. GB 2 223 869B (Tunstall) and patent application No. GB 2 223 380A (Shorrock Ltd). Ericsson discloses a system including a receiver unit and a transmitter unit, which when enabled transmits a location code and an identification code. The system also includes a number of strategically placed low power transmitter devices which due to their location and low power are able to be related to a specific area within a building.

These location transmitters would typically be placed near each door within a building, each would have a unique identity and a range of typically 5 meters. When the portable device is within range of the location transmitter it will receive and store the location information. In the event that the alarm transmitter is activated, the transmitter sends its own unique identification together with the stored identity of the last received location transmitter.

A central receiver can then process this information and with a reasonable degree of certainty determine the location of the person who activated the alarm.

Tunstall suggests a number of improvements to the Ericsson art, such improvements include the ability of the portable transmitter device to receive and store information from a plurality of location transmitters together with additional coding to enable a more accurate location fix to be determined, particularly if the system is required to operate within a building having more than one floor. A further improvement includes the ability of the local transmitter to initiate the portable alarm transmitter automatically by means of a modified location identity code.

Shorrock discloses technology which is very similar to Ericsson, however in this instance the location identifying units are interrogated to initiate the emission of the location information. An alternative embodiment makes use of well known bar code reading technology to determine the location of the individual.

All of the described prior art comprises a self contained alarm transmitter with integral locating device receiver/interrogator which can send an alarm signal together with the location of an individual in distress. Additional product exists within the market (hereinafter also referred to as prior art) which utilises the same technology, however the hand held alarm unit also includes a microphone and speaker arrangement with a receiver so that the unit can also be used for two way speech.

Since such products effectively comprise a two way personal radio with the locating technology combined within the one unit they tend to be very expensive when compared with standard two way radio transceivers.

A major disadvantage with the prior art is that any organisation wishing to provide their staff with an alarm system which utilises this type of location reporting technology must purchase this implementation of the technology even though they may already have an existing system utilising portable two way personal radio equipment. The lack of compatibility between the two systems is clearly undesirable.

Furthermore, the prior art alarm technology disclosed generally uses low power radio transmitters because the radio regulations stipulate certain frequencies must be used for such alarm equipment and the authorities only permit low power transmitters to be used on such frequencies. This results in a significant amount of system infrastructure being required in the event that a large site such as a shopping centre, large industrial facility or a prison is in need of protection.

Patent No. GB 2 247 761 A (Davis) discloses an alarm interface which is applied to a modified PCN (personal communications network) handportable. Davis suggests that the potential location of the handportable can be determined by virtue of the cell being used within a cellular radio network. This approach has two major disadvantages. The first being that the handportable needs to be modified. Modification can be expensive (if even possible), more importantly radio transmission equipment requires radio regulatory type approval testing, and such regulatory approval is invalidated upon modification of the approved product unless it is re-submitted for type testing. This is a very expensive process for hand portable radios and cellular radio equipment in particular. This option is clearly impractical for users of existing systems.

A second disadvantage is that it is only possible to identify location within the general coverage area of a cell. In a city typical cell coverage might be two kilometers in diameter which results in a totally inadequate positional resolution to be of any real use in an emergency.

It is an object of the present invention to provide a locating system that mitigates at least some of the aforementioned disadvantages.

According to the present invention there is provided a microphone unit for use with a portable two-way radio transceiver, for enabling oral communication via the radio transceiver, said microphone unit including a locating device for enabling said radio transceiver to transmit a signal containing position locating information, said locating device comprising a sensor for sensing a signal containing position locating information, a memory for storing position locating information obtained from said signal, a communications device for communicating with said radio transceiver, a control device for controlling said radio transceiver via said communications device and an activating means for activating said locating device, the arrangement being such that when the locating device is activated, said control device causes said radio transceiver to transmit a locating signal containing the position locating information stored in said memory.

The invention provides a microphone unit that can be connected to a conventional handportable radio transceiver, which enables the transceiver to transmit a locating signal containing position locating information. The location of the transceiver from which the locating signal was sent can thus be easily determined, allowing help to be sent quickly.

Because the locating device is connected to an existing handportable radio, a separate radio transmitter is not required and the system is thus very economical and users of the system are not required to carry additional items of equipment. Radio type approval is also not required and relatively high power radio transmitters can be used, thus minimising the necessary infrastructure. The microphone unit may be used as a replacement for a conventional microphone/loudspeaker unit.

Advantageously, the arrangement is such that when the locating device is activated, the control device causes said radio transceiver to transmit an alarm signal. The alarm signal may be transmitted simultaneously with the signal containing position locating information or separately therefrom. For example, the alarm signal may be transmitted first and the signal containing position locating information may be transmitted later, when demanded by the receiver of the alarm signal.

The sensor may be adapted to receive a signal containing position locating information from a local transmitter. The sensor may be adapted to receive an infrared signal, an ultrasound signal, an inductive signal, an electrostatic signal or an electromagnetic signal, for example a HF, UHF or VHF radio signal.

Alternatively, the sensor may be adapted to receive a plurality of signals from remote transmitters and to derive position locating information from those signals. For example, the position locating information may be derived from GPS signals or by means of interferometry.

The activating means may comprise a switch provided on the locating device, a remote switch having means for transmitting an activation signal to the locating device, means for sensing unauthorised removal of the locating device, means for sensing excessive movement, lack of movement and/or tilting of the locating device, means for sensing an activating signal transmitted to the locating device from a remote transmitter, either directly or via the radio transceiver, or any combination of these.

The locating device may be arranged to cause the radio transceiver to transmit audio activity automatically in the event of said locating device being activated, and may include means for recording audio activity taking place prior to activation.

The locating device may include means for storing an identification signal identifying said locating device, the arrangement being such that when the locating device is activated, the communications device causes the radio transceiver to transmit a locating signal containing said identification signal.

According to a further aspect of the present invention there is provided a locating system including a microphone unit as described above and a plurality of transmitters, each transmitter being arranged to transmit a signal containing position locating information. The system may also include a central station for receiving locating signals and/or alarm signals. Alternatively or in addition, each locating device may be arranged to receive locating and/or alarm signals transmitted by other locating devices.

A preferred embodiment of the invention provides a device which can, when connected to the existing two way personal radio, provide that two way radio with, as a minimum, all of the features of the prior art. Furthermore, because the existing transmitter and receiver within the two way radio are used, the technology required and hence the cost of the features is significantly reduced. Because there is no need to modify the existing equipment the issue of invalidating product type approval is avoided.

A further advantage is that the power of the transmitters used in two way personal radio equipment is generally much higher, since the regulations permit this. Large sites such as shopping areas are therefore easily protected at very reasonable cost.

Other methods of identifying the location of an individual which rely upon some form of processing within the device held by the individual include the well known Global Positioning System (GPS), and more recently interferometry techniques have been introduced. One technique, known as Cursor, is disclosed by Duffett-Smith and Woan and has a variant called High Precision (HP) Cursor. These and any future location technologies are readily incorporated with this new invention.

The present invention therefore provides a significant improvement in the scope of application of the existing prior art and other methods of location identification.

Many individuals who are responsible for the security of a building or similar facility, or who work alone, carry two way personal radios to enable them to contact their control centre or another party in the event that they require assistance or need to simply provide periodical communication to confirm their location and good health.

A disadvantage with this technique is that the location reporting is very much dependent upon the skill of the individual to know where they are. The technique also relies upon the individual being able to report this information, something they may not be able to do in the event they are incapacitated or being threatened by another individual.

The prior art technology can be (and in some cases has been) incorporated within the two way personal radio but this almost always results in some kind of performance compromise. In addition, because this means of implementation is complicated and relatively difficult to produce such systems are generally very expensive when compared with standard two way personal radios.

A further problem is that such location based two way radios are generally not compatible with any existing two way radio system infrastructure which may be in place. In addition, in the event that a more effective location technology is developed, it is not easy to upgrade the system as required: the entire system has to be replaced.

The present invention provides a very cost effective solution for these problems which also enables existing radio system to be upgraded very simply and cost effectively. The concept of the invention can easily be applied to other communication devices such as cellular radios and mobile radios installed within vehicles.

Virtually all types of personal radio available include a facility to connect an optional remote lapel microphone/loudspeaker unit (sometimes referred to as an accessory connector). Such lapel microphone/loudspeaker units also include a switch to activate the transmitter when the user wishes to speak.

This external lapel microphone/loudspeaker unit enables the user to keep their portable radio on their hip, waist or covertly hidden. A further benefit is that such an option provides protection for the user's head from the electromagnetic signal generated by the radio transmitter aerial, a subject of some concern in recent times.

The connection style and format for these lapel microphone/loudspeaker units is usually specific to the manufacturer, but common for each version of radio. The connections provided are usually as a minimum:

signal wires for the lapel loudspeaker, signal wires for the lapel microphone, and signal wires for the press to talk or transmit switch An embodiment of the present invention provides a special version of the optional lapel microphone/loudspeaker unit (hereinafter referred to as the "lapel unit"), which includes circuitry that has the ability to determine the location of the lapel unit and enable the user to send voluntary or involuntary alarms.

In the event that the version of personal radio for which the lapel unit was designed did not provide any electrical power at the lapel unit connecting point then an integral power supply (such as a battery) would also be included.

Inclusion of a microcontroller and modem technology, the principle of which is well known, would enable the central control system to communicate with the lapel unit (or vice versa) either automatically or as a result of manual intervention on the part of the person using the lapel unit.

The exact nature of the location technology incorporated within the lapel unit would depend upon the needs of the customer. Typical situations in which the invention may be used include:

An individual who works within a building and has to patrol the various locations within that building on a regular basis.

An individual who has to patrol an area outside a building or a mixture of outside and within a building or buildings An individual who has to work alone in wide area open spaces, such as a farmer.

An individual who has to work in a situation represented by any combination of the above.

Different technology works better in different situations. Ericsson, Tunstall and Shorrock describe technology which works very well within buildings. The preferred method described utilises electromagnetic/inductive coupling at typically 150 KHz. This is because this technology has the ability to penetrate clothes which may cover the alarm transmitter worn by the person being protected.

A disadvantage with this method, which is described by the Tunstall document, is that the signal is capable of penetrating walls, floors and ceilings. The use of infrared is not recommend because it is relatively poor at penetrating clothing.

An advantage with the lapel unit is that such units are worn externally in order for the user to be able to hear any message which may be sent via the speaker unit. Since the lapel unit is not covered, infrared can therefore be used as one method of internal location identification with a high degree of success. Localised infrared transmitting beacons can then be deployed to identify the required areas. Ultrasound based location beacons could also be used for the same reasons.

The use of inductive coupling for outside applications is not very effective, principally because the range of these location transmitters is generally very limited at typically five meters. A much better alternative would be to use higher frequency VHF or UHF low power transmitters, the preferred operating frequency being in the 170 MHz to 900 MHz range. These devices have a range of typically 50 to 100 meters and can be easily adjusted to provide a range to suit the location concerned. A compatible receiver would be fitted within the lapel unit.

The low power UHF/VHF location beacons can easily be installed in external locations such as the periphery of a building, the propagation of the signal being controlled in such a manner that the signal does not penetrate the building and confuse the system. An advantage with the low power VHF/UHF location beacons is that they are very efficient and do not require much power. This would enable the location transmitter to be powered by battery for a significant period of time, typically one year or more.

The location beacon could also incorporate a low battery alarm which could be relayed to the control system to advise when the battery requires replacing. This again results in very cost effective installation because wiring to provide power to the location transmitter is not required. In instances where the ambient light was known to be dependable solar power could be used to eliminate the need to change batteries.

For larger areas such as open fields the lapel unit could incorporate a GPS receiver. At the present time GPS receivers require a relatively high amount of power, as technology advances however this will not continue to be a significant issue and the incorporation of GPS technology with a lapel unit would be practical and cost effective.

Until such time as the GPS unit is sufficiently small enough and power requirements are sufficiently low enough for such integration the GPS unit could be carried in a separate unit which can by means of using the location receive data path transmit the GPS location data to the lapel unit for re-transmission by the personal radio. This would be particularly useful in a vehicle where the GPS module would be separate and the location data passed to the lapel unit whilst this was at rest on the dashboard. In such instances location data transfer could be either by low power radio or infrared, for example.

An alternative would be to incorporate a receiver within the lapel unit to receive the signals from the HP Cursor technology, an alternative to GPS. The resulting data could then be transferred to a central computer to enable the position of the individual to be determined. At present the HP Cursor technology provides reliable positional accuracy of typically 1 meter.

As the HP Cursor technology improves, it will no doubt be possible to achieve greater positional resolution thereby avoiding the need to use internal location beacons. The system software would however need to determine the general route of an individual in order to identify which side of a wall a person may be, for example. Alternatively, a small number of fixed beacons could be used to assist in the identification of floors, these beacons also assisting in the dynamic calibration of HP Cursor since their fixed location would be a constant.

As and when alternative location determining technology which requires some form of sensor at the portable equipment in order for the location to be determined is developed, the appropriate processing circuitry could be incorporated within the lapel unit to enable existing personal radio equipment to benefit from such advances in technology without modification.

In a similar manner, the lapel unit can incorporate any combination of the described location technology in order to provide the most effective solution.

The capability of the invention to receive and process large area based location technology also permits a further application of the invention for the purpose of determining the location of vehicles. Vehicles which utilise two way radio systems can also suffer from the previously described problems associated with providing such radio equipment with location based technology.

In this instance a separate GPS based location determining module could transfer the location data to the microphone unit for transmission to a central computer by means of the two way radio within the vehicle. Because of the very short range within the vehicle, infrared would be the preferred method to transfer location data from the GPS receiver to the microphone unit.

Once again it can be seen the invention permits very cost effective upgrade of existing radio installations to enable valuable additional facilities to be provided with ease.

Once the required location technology has been implemented, it is very easy to include additional features such as a panic button which the user can press when assistance is required in the event of an emergency. Further features would include a facility to detect the forced removal of the lapel unit from the wearer, and a mechanism to detect that the wearer has stopped moving, has fallen over, or is running. The system could also include a facility to check the correct functioning of the entire system on a periodical basis.

A particular problem which exists for sensitive situations such as prison officers is that the very act of being seen to activate the panic switch can provoke attack. If the version of lapel unit with a VHF/UHF receiver is used (as when detecting VHF/UHF location beacons) then the user could be provided with a miniature panic transmitter which could be disguised as a key fob and kept in the pocket or as a piece of jewellery such as a ring worn on the finger.

The covert activation of such a low power transmitter would be detected by the lapel unit as a special alarm code and would therefore command the portable transmitter to send the appropriate alarm signal to the control room.

Another useful feature in sensitive situations would be the ability to record the audio sounds which took place in the time prior to the alarm being raised. Such microchip recording technology is well known, and could be incorporated within the lapel unit with the ability for the central controller to control the replay of the recorded audio. The sensitivity of the microphone could be controlled to enable any audio within the general area of the lapel unit to be transmitted back to the control room.

Once the alarm and location information has been received at the central equipment it can then be processed as required. This processing may be by action of a human operator, or automatically by means of a computer system which having processed the alarm and location information could arrange for the appropriate pre recorded alarm and location messages to be broadcasted to other individuals capable of rendering assistance. Should these other individuals also have the lapel unit with location technology the system could advise which individuals were most appropriately located to render assistance soonest.

These and other objects of the present invention will become readily apparent upon further review of the following specification and drawings.

An embodiment of the present invention will now be described, by way of example, with reference to the accompanying drawings, in which.

Figure 1:
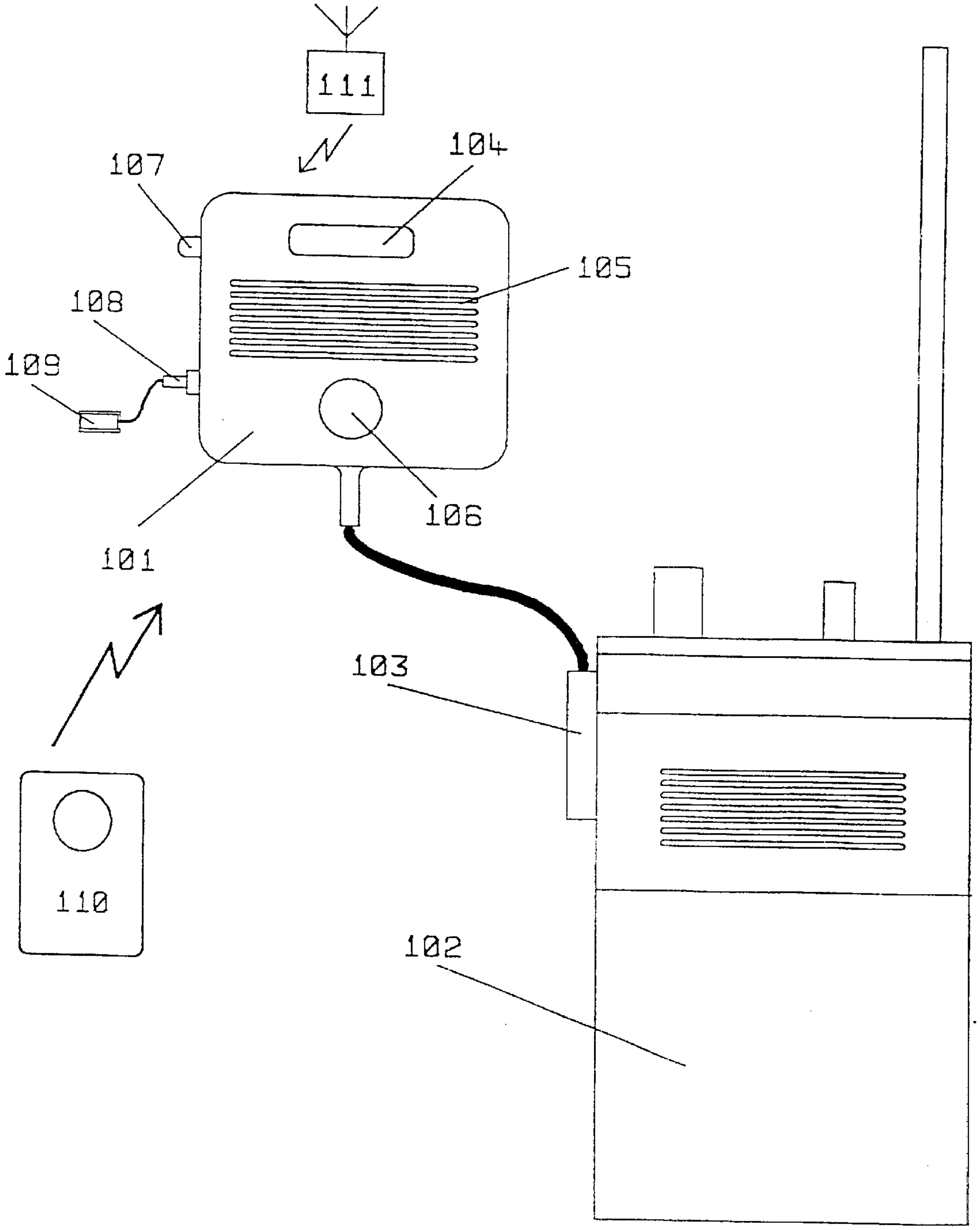
FIG. 1 is a sketch of a hand held personal radio with the lapel unit.

A preferred embodiment of the present invention is detailed in FIG. 1 where lapel unit 101 is connected by means of an accessory connector 103 to a conventional handportable radio unit 102. The lapel unit 101 comprises an infrared detection window 104 to determine location by reception of signals from location transmitters, a microphone/speaker unit 105, a transmit button 107, a panic button 106 for use when in distress and a clip 109 which is attached to the user such that when the lapel unit is removed alarm pin 108 is pulled activating a snatch alarm.

For covert activation of the panic alarm a small discrete hand held transmitter 110 can be operated without the user having to touch the lapel unit or the handportable radio. Hand held transmitter 110 could be adapted and incorporated within other items resulting in an alarm being detected when the wearer of the system entered an area within which the transmitter was located.

When the location of the user needs to be determined over a large area, GPS or interferometry techniques would be used. In this instance wide area location determining sensor 111 could either be incorporated as an integral element of the lapel unit or provided as a separate belt worn unit. In this instance the location data would be transferred to the lapel unit by means of a modified location beacon transmission.

Figure 2:
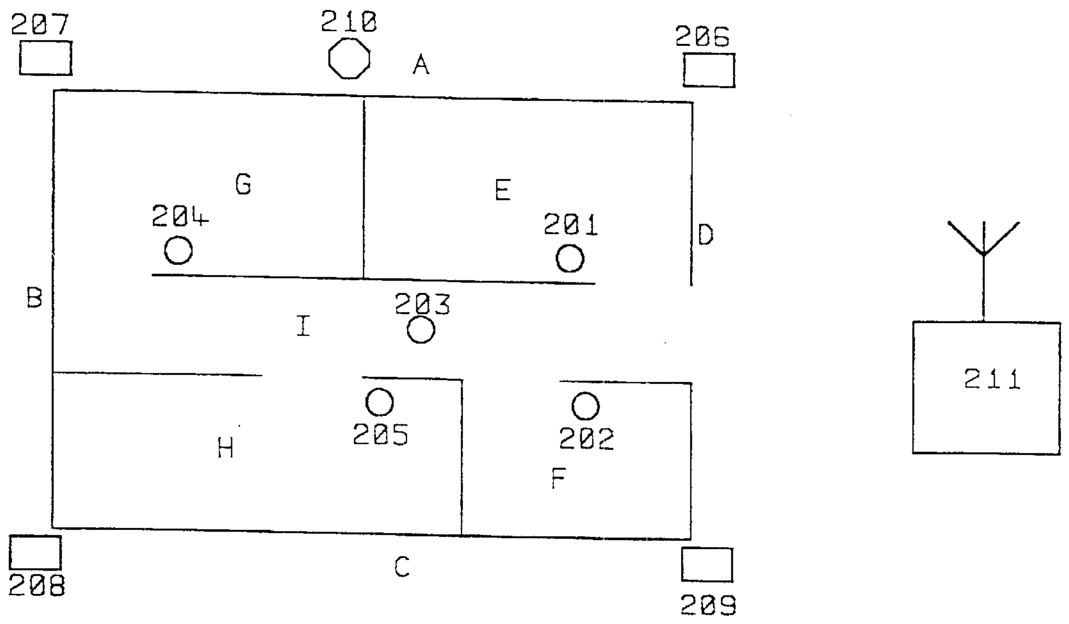
FIG. 2 is a sketch of a personal radio with the lapel unit in conjunction with location devices and the central control system.

FIG. 2 demonstrates a typical use of the invention where a number of preferably infrared, but optionally ultrasonic, inductive or electrostatic based location devices 201–205 would be placed within the building whilst a number of preferably VHF/UHF but optionally inductive, ultrasonic or electrostatic based devices 206–209 would be placed externally to the building. The combined handportable transceiver/lapel unit 210 would then detect each location beacon 201–209 as the wearer passed each beacon and so enable the location to be determined. When commanded to do so either automatically or by action of the wearer the combined handportable transceiver/lapel unit 210 would communicate its location to central control unit 211. The general concept of such a system for location identification is detailed by Ericsson in GB 2 051 444B, the content of which is incorporated by reference herein.

Figure 3:
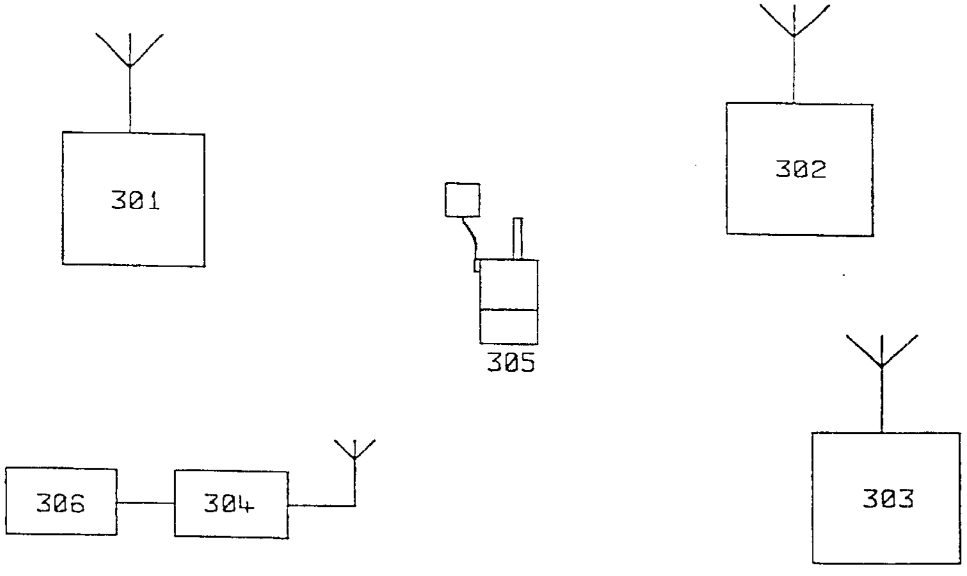
FIG. 3 is a block diagram of the system based upon HP Cursor.

FIG. 3 describes an system utilising the HP Cursor technology. The location technology is relatively new and is therefore described herein to provide an appreciation of its application within this new invention.

A minimum of three fixed transmitters 301, 302 and 303 are required. Indeed these transmitters can be existing public broadcast transmitters if desired, however there are disadvantages to this as described by Duffett-Smith and Woan. The preferred operating frequency of these transmitters is in the region of 2 MHz, each transmitter having a different frequency with in a band of typically 10 KHz.

A fixed receiver 304 is used to enable comparisons in the characteristics of the received signals from 301,302 and 303 with that of the received signal from lapel unit 305. The preferred characteristic to be measured with HP Cursor is the phase difference of each signal. A system processor 306 is used to analyse the signals received from fixed receiver 304 and mobile receiver 305 in order to determine the location of mobile receiver lapel unit combination 305. Not e that processor 306 could in fact be located within the lapel unit 305, at the fixed receiver 304 or any intermediate location. A preferred option would be with fixed receiver 304. This would reduce the cost of lapel unit 305 and that of the entire system since processor 306 could clearly calculate data for a plurality of lapel units.

Figure 4:
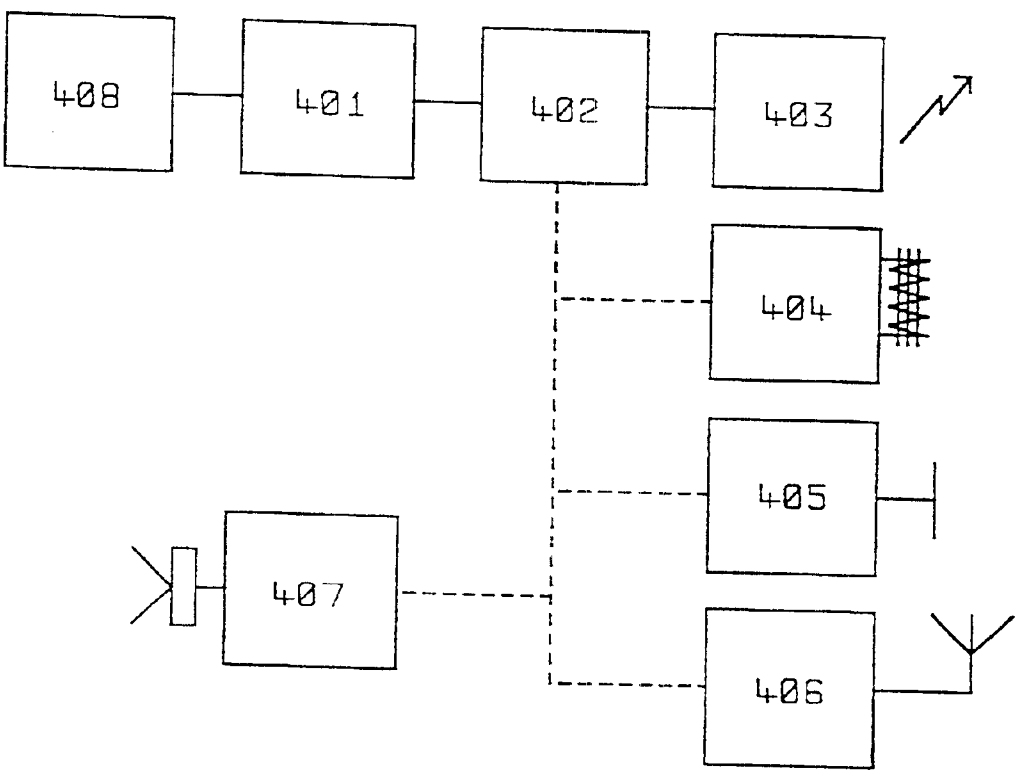
FIG. 4 is a block diagram of a location transmitter.

The location transmitter described in FIG. 4 comprises an encoding device 401 which generates data to enable the specific location of the location transmitter to be identified, driver unit 402 which would convert the code signal into one suitable to drive either infrared output 403, induction output 404, electrostatic output 405, HF/VHF/UHF output 406 or ultrasound output 407 as desired depending upon the preferred location transmitter technology.

Power unit 408 provides all location transmitter modules with operating voltage and can be powered by battery, solar energy, mains or any combination of the three. Power unit 408 can also incorporate a monitor to modify the transmission code of encoding device 401 so that the central monitor can be advised of the power status of the location transmitter. In a similar manner a sensor could be incorporated to indicate unauthorised tampering with the location transmitter.

In the event that the location transmitter is to used as a source for phase measurement as an element of the HP Cursor system the encoding device 401 would not be necessary, since this technology only requires a carrier signal from the fixed transmitters. Occasional identification coding could however be used as a means of monitoring the correct function of the transmitter.

Figure 5:
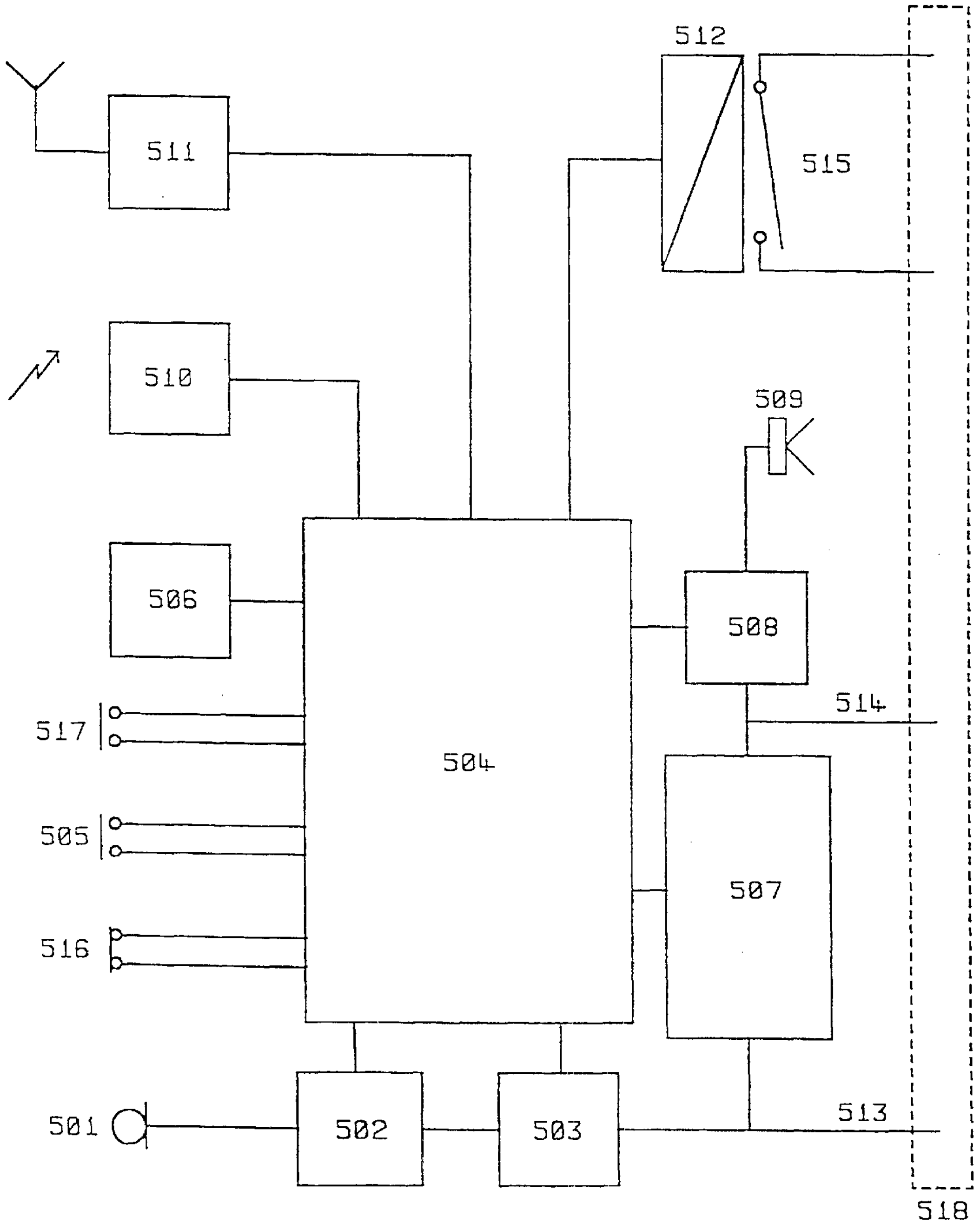
FIG. 5 is a block diagram of the lapel unit.

The lapel unit is described in greater detail in FIG. 5 and comprises a number of elements. The circuitry within the lapel unit needs to be interfaced with the handportable radio for receive audio/data, transmit audio/data and transmitter control. The data is interfaced by means of modem 507, receive audio wires 514 and transmit audio wires 513, and transmit/receive control is achieved by transmit enable relay 512 and transmit wires 515. A connector 518 which would be of a type suitable to interface with the desired transceiver would be fitted to the end of the lapel unit wires to facilitate connection to the transceiver.

Under normal circumstances the handportable will be in receive mode and the contacts of transmit relay 512 open. Any received information will be sent via the lapel unit connector 518 to receive path wires 514 to modem 507 and speaker amplifier 508. Data received by modem 507 is processed by microcontroller 504. If the data message indicates that speech is available for the lapel unit then microcontroller 504 will turn on speaker amplifier 508 and route the receive audio to speaker 509. If an audio bleep alarm is required to alert the user the microcontroller 504 can produce this and activate the speaker 509 using amplifier 508.

Should the user wish to speak to the control centre then closing push to talk switch 505 will instruct the microcontroller 504 to close the contacts of push to talk relay 512 sending a transmit signal to the lapel unit connector via transmit function wires 515. If desired, the lapel unit could automatically send lapel unit identification and location data by means of modem 507 and transmit audio wires 513 each time the press to talk button 505 is activated. When the user speaks speech is detected by microphone 501 and amplified by microphone amplifier 502 before connection to the handportable by transmit audio signal 513.

Speech recording chip 503 is activated if required to record audio detected by microphone 501 on a continuous basis. In this instance microphone sensitivity is controlled by microcontroller 504 so that any important sounds (such as in a struggle prior to an attack) are recorded. Upon receipt of the appropriate command from the central controller the microcontroller 504 will play back any recorded sounds and transmit these via the connected handportable to the controller for analysis.

Infrared receiver 510 is for internal building use and sends demodulated infrared data to microcontroller 504 for analysis and storage. Depending upon exact programme instructions held within microcontroller 504 the location data can either be stored or transmitted immediately (and automatically) by activation of transmit relay 512 and use of modem 507. A significant benefit of a two way system is that the microcontroller 504 can communicate with the control system to determine that a good radio path exists prior to sending the location and identification data.

Furthermore, once this data has been sent the central control system can confirm that the data was received without any errors. In situations where the use of infrared is undesirable, inductive or electrostatic techniques can be used for in-building location transmitters providing due regard is given to problems relating to penetration of walls, floors and ceilings as has been mentioned before.

UHF/VHF receiver 511 is for reception of signals from low power UHF/VHF location transmitters which may be placed in outside areas. Alternatively, the receiver 511 can be used to receive and process data from a co-located GPS receiver module, or indeed may be replaced by a GPS receiver module. Received data is again processed by microcontroller 504 as previously described for the infrared receiver 510. Receiver 511 can also be used to receive special alarm codes from local beacons or a covert attack transmitter held by the lapel unit wearer or perhaps an associated party.

Sensor 506 detects either lack of movement, too much movement (running) or a horizontal position (individual collapsed), depending upon the nature of the sensor. The sensor activity is processed by microcontroller 504 which would typically warn the user by means of a bleep via amplifier 508 and speaker 509 before transmitting an alarm and location information. This would enable the wearer of the lapel unit to cancel what might be a false alarm due to a temporary change in posture in the event of a tilt sensor being used, for example. In the event that suitable power was not available from the handportable radio via connector 518 then a local battery power supply would be provided with low battery alarm function to warn the user accordingly.

Normally closed switch 516 is used to detect unauthorised removal of the lapel unit from the wearer and send an appropriate emergency alarm to the central control. In a similar way attack switch 517 would send an attack alarm signal to the central control room if activated by the lapel unit wearer. In all cases location information, identification information, and live and recorded audio could also be transmitted.

There may be some instances where the user would not wish to wear a lapel unit, but carry the handportable radio or wear the handportable radio at waist level by means of a clip or belt. In this instance the "lapel unit" would be fashioned in such a manner that it could be physically placed alongside the handportable radio whilst still being connected by means of the external microphone/loudspeaker or accessory connector.

Clearly any of the preferred location determining technologies could be replaced by or complemented with alternative technology such as Global Positioning System or interferometry (HP Cursor) based location technology, or any future technique for location determination which may be developed. In a similar manner the lapel unit could readily incorporate more than one type of positioning technology to satisfy the overall requirement for location identification, e.g. infrared for within a building, and HP Cursor for outside the building.

According to a preferred embodiment of the invention there is provided a device comprising a means of transferring audio signals to or from an independent radio configured with a transmitter and a receiver with a means of determining the location of the device such that the location of the independent radio can be determined, the location information being provided as a result of electromagnetically coupled positioning signals, the analysis of which enable the position of the device to be determined.

The electromagnetically coupled location information may be provided by means of individual location beacons providing a signal which uniquely identifies the location concerned, or individual Earth based transmitters, the subsequent analysis of which enables the location to be determined, or individual orbital satellites, the subsequent analysis of which enables the location to be determined.

Advantageously, an alarm can be initiated as a result of action by the user of the device, or as a result of lack of action by the user of the device.

Advantageously, transmission can be initiated as a result of the receipt of the electromagnetically coupled location information or data contained within the electromagnetically coupled location information, or as a result of failure to receive the electromagnetically coupled location information.

Advantageously, an alarm can be initiated as a result of action by a person other than the user of the device, or the receipt of an electromagnetically coupled signal initiated by another alarm transmitter.

The transmitters may be powered by self contained power sources, optionally with the assistance of solar energy.

Advantageously, the audio activity taking place prior to activation can be recorded.

Advantageously, the device is worn on the body separately to the transceiver and is connected to the transceiver by means of electromagnetic connection. Alternatively, the device is co-located with the associated transceiver and is connected to the transceiver by means of an electromagnetic connection.

The invention also preferably provides a system comprising at least one location transmitter and a location determining device that can be connected to an existing radio transceiver in such a manner that the regulatory type approval of that radio transceiver is not impaired, the device being capable of maintaining the speech communication with the radio transceiver whilst also providing the capability to send an alarm and determine the location of the radio transceiver by receiving and decoding a signal from the location transmitter and reporting the alarm and location information to a central controller. Alarm conditions can be provided with location information either by means of action of the user, lack of action of the user or by automatic initiation of the system. The device can also incorporate other location based technology such as the Global Position System or interferometry for large area location determination. The device can also receive modified transmissions to initiate covert alarm conditions.

What is claimed is:

1. A microphone unit comprising a locating device, said locating device comprising:

- a sensor for sensing a signal containing position locating information;
- a memory for storing said position locating information obtained from said signal;
- a communications device adapted for communicating with a radio transceiver;
- a control device for controlling the radio transceiver via said communications device; and
- activating means for sensing an alarm condition and activating said locating device in response to said alarm condition;
- wherein when said activating means senses said alarm condition, said locating device is activated and said control device causes the radio transceiver to transmit a signal containing said position locating information.

2. A microphone unit according to claim 1, the arrangement being such that when the locating device is activated, said control device causes the radio transceiver to transmit an alarm signal.

3. A microphone unit according to claim 1, wherein said sensor is adapted to receive a signal containing position locating information from a local transmitter.

4. A microphone unit according to claim 3, wherein said sensor is adapted to receive an infrared signal.

5. A microphone unit according to claim 3, wherein said sensor is adapted to receive an ultrasound signal.

6. A microphone unit according to claim 3, wherein said sensor is adapted to receive an inductive signal.

7. A microphone unit according to claim 3, wherein said sensor is adapted to receive an electrostatic signal.

8. A microphone unit according to claim 3, wherein said sensor is adapted to receive an electromagnetic signal.

9. A microphone unit according to claim 1, wherein said sensor is adapted to receive a plurality of signals from remote transmitters and to derive position locating information from said signals.

10. A microphone unit according to claim 1, wherein said activating means comprises a switch provided on said locating device.

11. A microphone unit according to claim 1, wherein said activating means comprises a remote switch comprising means for transmitting an activation signal to the other parts of the locating device.

12. A microphone unit according to claim 1, wherein said activating means comprises means for sensing unauthorised removal of said locating device.

13. A microphone unit according to claim 1, wherein said activating means comprises means for sensing excessive movement, lack of movement or tilting of said locating device.

14. A microphone unit according to claim 1, wherein said activating means comprises means for sensing an activating signal transmitted to said locating device from a remote transmitter.

15. A microphone unit according to claim 1, wherein said locating device is arranged to cause said radio transceiver to transmit audio activity automatically if said locating device is activated.

16. A microphone unit according to claim 1, wherein said locating device includes means for recording audio activity taking place prior to activation of said locating device.

17. A microphone unit according to claim 1, wherein said locating device includes means for storing an identification signal identifying said locating device, said means for storing said identification signal being such that when said locating device is activated, said communications device causes said radio transceiver to transmit a signal containing said identification signal.

18. A locating system comprising a microphone unit according to claim 1 and a plurality of transmitters, each of said plurality of transmitters being arranged to transmit a signal containing position locating information.

19. A kit for providing a radio transceiver with a locating device, said kit comprising:

- a microphone unit comprising a locating device, said locating device comprising:
  - a sensor for sensing a signal containing position locating information;
  - a memory for storing said position locating information obtained from said signal;
  - a communications device adapted for communicating with the radio transceiver;
  - a control device for controlling the radio transceiver via said communications device; and an activating means for sensing an alarm condition and activating said locating device in response to said alarm condition, wherein when said activating means senses said alarm condition, said locating device is activated and said control device causes the radio transceiver to transmit a signal containing said position locating information.

20. A method for retrofitting a radio transceiver with a locating device, said method comprising the steps of:

connecting a microphone unit to the radio transceiver, said microphone unit comprising a microphone unit comprising a locating device, said locating device comprising:

a sensor for sensing a signal containing position locating information;

a memory for storing said position locating information obtained from said signal;

a communications device adapted for communicating with the radio transceiver;

a control device for controlling the radio transceiver via said communications device; and an activating means for sensing an alarm condition and activating said locating device in response to said alarm condition, wherein when said activating means senses said alarm condition, said locating device is activated and said control device causes the radio transceiver to transmit a signal containing said position locating information stored in said memory.

* * * * *